(12) United States Patent
Knapp et al.

(10) Patent No.: US 6,833,979 B1
(45) Date of Patent: *Dec. 21, 2004

(54) STRUCTURE AND METHOD FOR REDEPOSITION FREE THIN FILM CPP READ SENSOR FABRICATION

(75) Inventors: Kenneth E. Knapp, Livermore, CA (US); Ronald A. Barr, Mountain View, CA (US); Lien-Chang Wang, Fremont, CA (US); Benjamin P. Law, Fremont, CA (US); James Spallas, Dublin, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/176,874

(22) Filed: Jun. 21, 2002

Related U.S. Application Data

(63) Continuation of application No. 09/327,209, filed on Jun. 7, 1999, now Pat. No. 6,433,970.

(51) Int. Cl.$^7$ ................................................ G11B 5/39
(52) U.S. Cl. ................................................... 360/322
(58) Field of Search ................................. 360/322, 319

(56) References Cited

U.S. PATENT DOCUMENTS

| | | |
|---|---|---|
| 4,914,538 A | 4/1990 | Howard et al. |
| 5,268,806 A | 12/1993 | Goubau et al. |
| 5,491,600 A | 2/1996 | Chen et al. |
| 5,668,688 A | 9/1997 | Dykes et al. |
| 5,680,282 A | 10/1997 | Alhert et al. |
| 5,828,532 A | 10/1998 | Ahlert et al. |
| 5,883,764 A | 3/1999 | Pinarbasi |
| 5,901,018 A | 5/1999 | Fontana, Jr. et al. |

(List continued on next page.)

FOREIGN PATENT DOCUMENTS

| | | | | |
|---|---|---|---|---|
| JP | 61084572 A | * | 4/1986 | ........... G01R/33/06 |
| JP | 63095983 A | | 4/1988 | |
| JP | 06053649 A | | 2/1994 | |
| JP | 07073418 | | 3/1995 | |
| JP | 10208217 A | * | 8/1998 | ............ G11B/5/39 |
| JP | 11039611 | | 2/1999 | |

OTHER PUBLICATIONS

Lee, Robert E., "Microfabrication by Ion–Beam Etching," J. Vac. Sci. Technol., 16(2), Mar./Apr. 1979, pp. 164–70.
Melliar–Smith, C.M., "Ion Etching for Pattern Delineation," J. Vac. Sci. Technol., 13(5), Sep./Oct. 1976, 1008–22.

(List continued on next page.)

*Primary Examiner*—William Klimowicz
(74) *Attorney, Agent, or Firm*—Carr & Ferrell LLP

(57) ABSTRACT

The present invention provides an improved current perpendicular to the plane thin film read head device and method of fabrication. With the present invention, the lower lead is formed to inhibit accumulation of redeposited lead material on CPP sensor element side walls during CPP sensor formation. In the preferred embodiment, the upper portion of the lower lead, which normally is etched during sensor element formation, is formed of a low sputter yield material to reduce redeposition flux to the sensor side walls. It is also preferred to form the upper portion of a material that also has a low value for the ratio of its sputter yield at the lead milling angle-to-its sputter yield at the side wall milling angle to inhibit redeposition accumulation on the side wall. It is preferred to clad conventional lead material with a low sputter yield ratio, low resistivity material, to inhibit side wall redeposition accumulation while also providing a low resistance lower lead. The underlying lead material may be formed of conventional low resistance lead materials with a cladding of a refractory metal, such as tantalum, titanium, tungsten, molybdenum, zirconium, vanadium, niobium, their alloys, or the like. The improved CPP read head of the present invention may be embodied in a data storage and retrieval apparatus.

27 Claims, 5 Drawing Sheets

U.S. PATENT DOCUMENTS

| | | |
|---|---|---|
| 5,959,811 A | 9/1999 | Richardson |
| 6,002,553 A | 12/1999 | Stearns et al. |
| 6,023,395 A | 2/2000 | Dill et al. |
| 6,114,719 A | 9/2000 | Dill et al. |
| 6,118,638 A | 9/2000 | Knapp et al. |
| 6,134,089 A | 10/2000 | Barr et al. |
| 6,249,407 B1 | 6/2001 | Aoshima et al. |
| 6,433,970 B1 | 8/2002 | Knapp et al. |

OTHER PUBLICATIONS

Cantagrel, Michel, "Considerations on High Resolution Patterns Engraved by Ion Etching," IEEE Transactions on Electron Devices, vol. ED–22, No. 7, Jul. 1995, pp. 483–86.

U.S. patent application Ser. No. 10/175,399, Structure and Method for Redeposition Free Thin Film CPP Read Sensor Fabrication Knapp filed Jun. 18, 2002.

\* cited by examiner

STRUCTURE AND METHOD FOR REDEPOSITION FREE THIN FILM CPP READ SENSOR FABRICATION

CROSS REFERENCE TO RELATED APPLICATIONS

This application is a continuation of U.S. application Ser. No. 09/327,209 filed on Jun. 7, 1999, now U.S. Pat. No. 6,433,970, and claims priority therefrom pursuant to 35 U.S.C. §120.

This invention was made with Government support under a Cooperative Agreement (CRADA TC-840-94) and the Managing and Operating Contract (W-7405-ENG-48) with the Regents of the University of California. The Government has certain rights in this invention.

BACKGROUND

Data is stored on magnetic media by writing on the magnetic media using a write head. Magnetic media can be formed in any number of ways, such as tape, floppy diskette, hard disk, or the like. Writing involves storing a data bit by utilizing magnetic flux to set the magnetic moment of a particular area on the magnetic media. The state of the magnetic moment is later read, using a read head, to retrieve the stored information.

Conventional thin film read heads employ magnetoresistive material, generally formed in a layered structure of magnetoresistive and non-magnetoresistive materials, to detect the magnetic moment of the bit on the media. A sensing current is passed through the magnetoresistive material to detect changes in the resistance of the material induced by the bits as the media is moved with respect to the read head.

The magnetoresistive effect, given by $\Delta R/R$, may be detected by passing a sensing current through the sensor along the plane of the layers, or by passing current through the sensor perpendicular to the plane of the layers. By passing the sensing current perpendicular rather than parallel to the plane, shunt current through non-magnetoresistive layers of the sensor can be eliminated, thus improving the magnetoresistive effect.

Current perpendicular-to-the-plane devices or CPP devices may have a giant magnetoresistive multilayer, a spin tunneling junction, a spin valve, or other stacked type sensor device. For example, U.S. Pat. No. 5,668,688, by Dykes et al., entitled CURRENT PERPENDICULAR-TO-THE-PLANE SPIN VALVE TYPE MAGNETORESISTIVE TRANSDUCER, issued on Sep. 16, 1997, herein incorporated by reference in its entirety, discloses a possible CPP device.

CPP devices while overcoming some problems associated with the current in the plane or CIP devices, have other design problems. For example, U.S. Patent entitled MAGNETORESISTIVE TRANSDUCER WITH FOUR-LEAD CONTACT, by David Richardson, et al., Ser. No. 09/006,307, filed on Jan. 13, 1998, issued as U.S. Pat. No. 5,959,811 on Sep. 28, 1999, herein incorporated by reference in its entirety, describes problems associated with providing electrical contacts to the magnetoresistive sensors. With CPP devices, because the thin film layers have such a low resistance perpendicular to their plane, the resistance of the sensing leads significantly reduces the magnetoresistive effect of the device. Thus, it is important to minimize the resistance of the leads. As such, the leads typically are formed of low resistance conductive materials, such as Au, Ag, Al, Cu, or the like.

Low resistance lead materials, on the other hand, have been observed by the present inventors to create another problem in CPP devices. Because the magnetoresistive stack typically is formed on the lead material, the lead material is partially etched when defining the magnetoresistive stack. This causes lead material to redeposit on the side walls of the magnetoresistive stack. This is particularly true at small geometries.

The redeposited lead material creates a shunt path around the layers which significantly reduces the magnetoresistive effect. Due to the smaller path length, such current shunting is even more detrimental in CPP devices than in than the current shunting that occurs along the layers of CIP devices. Thus, while low resistance leads are necessary for optimizing the magnetoresistive effect, their redeposition on the side wall can significantly reduce the magnetoresistive effect by providing a low resistance shunt path around the stack.

BRIEF SUMMARY OF THE PREFERRED EMBODIMENTS

The preferred embodiments of the present invention provide an improved current perpendicular to the plane thin film read head device and method of fabrication. A current perpendicular to the plane or CPP sensor element is formed between upper and lower sensor lead structures which couple sensing current to the sensor element. With the preferred embodiments of the present invention, the lower lead is formed to inhibit accumulation of redeposited lead material on the side walls of the sensor element.

In the preferred embodiment, the lower lead is formed so that the upper portion of the lead, which normally is etched during sensor element formation, is formed of a low sputter yield material. This provides improved process control and reduces redeposition flux to the side walls of the sensor element thus reducing accumulation of redeposition on the side walls.

In addition, it is preferred to form the upper portion of the lower lead of a material that also has a low value for the sputter yield ratio of low milling angle-to-high milling angle for the milling angle selected to form the sensor element. In general, the sputter rate preferably should increase for milling angles from about 20 to 70 degrees. This allows a small milling angle, with respect to normal, to be used to define the sensor element. Because the sensor sidewall is generally perpendicular to the lead surface, the milling angle of the sensor sidewall is large when a small milling angle is used to form the sensor element. As such, the higher sputter rate at the high milling angle of the sidewall will inhibit accumulation of redeposited lead material on the sensor.

Using a smaller milling angle to define the sensor element improves processing characteristics and allows for more precise formation of a smaller sensor element. The present invention, therefore, allows for smaller track width devices, thus improving the aerial density of data storage and retrieval apparatuses.

In a preferred embodiment, conventional lead material is clad with a low sputter yield ratio material to form the lower lead to reduce the resistance of the lower lead structure. The cladding may have one or more layers of material. In this embodiment, the underlying lead material may be formed of conventional low resistance lead material such as Au, Ag, Cu, Al, or the like. Hence, the effective resistance of the clad lead is lower than a lead that is formed of only, or a large amount of, low sputter yield ratio material. As such, in one embodiment it is preferred to minimize the thickness of the cladding, while providing sufficient thickness to prevent etching of the underlying lead material.

Furthermore, although redeposition accumulation may be reduced by cladding only the portion of the lead material exposed to ion milling from low sputter ratio material, in the preferred embodiment, the sensor element is formed of the cladding. As such, it is preferred that the cladding material be a low sputter ratio material that also has low resistivity, to minimize lead resistance, thus optimizing the magnetoresistive effect. Refractory metals, such as tantalum, titanium, tungsten, molybdenum, zirconium, vanadium, niobium, their alloys, or the like are expected have desirable low sputter yield ratios and sufficiently low resistivity so as to not significantly reduce the magnetoresistive effect of the device.

In addition, as the cladding of preferred embodiments has a higher resistivity than typical lead materials, any sidewall redeposition that may occur will have higher resistivity than conventional sidewall deposition. Thus, even if some amount of redeposition does occur, preferred embodiments provide reduced shunt current in sidewall redeposition as compared to conventional lead material sidewall deposition.

The improved CPP read head may employ a giant magnetoresistive multilayer, a spin valve, a spin tunneling junction, or other known CPP stack type element. The improved CPP read head of the present invention may be embodied in a data storage and retrieval apparatus.

DETAILED DESCRIPTION OF THE PREFERRED EMBODIMENTS OF THE INVENTION

Figure 1:
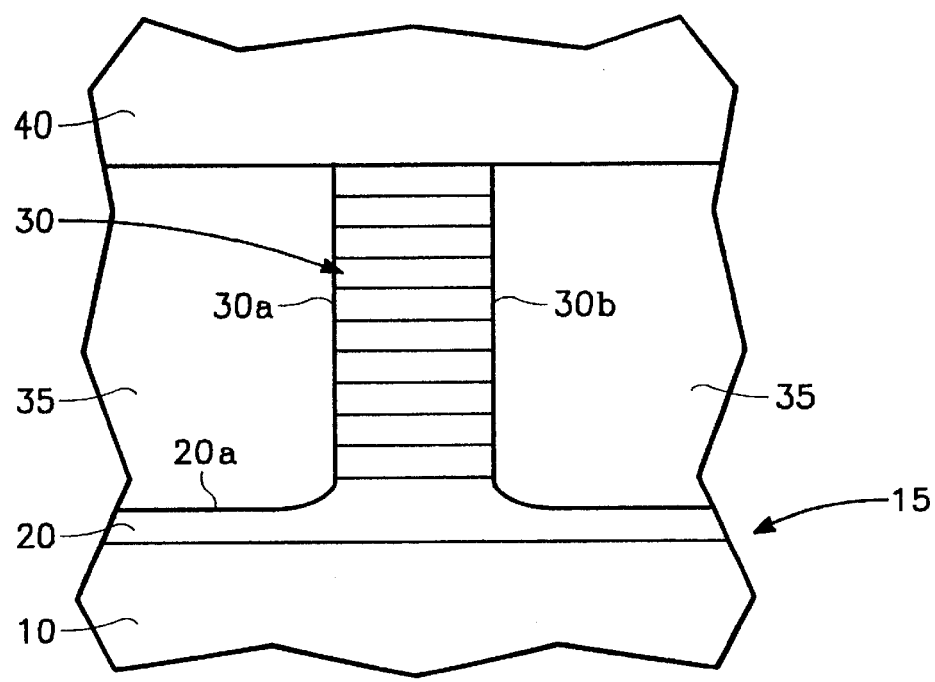
FIG. 1 shows a view from the air bearing surface of current perpendicular to the plane read head in accordance with the present invention.

FIG. 1 shows a view from the air bearing surface of a current perpendicular to the plane or CPP read head in accordance with the present invention. With the present invention, a current perpendicular to the plane or CPP sensor element 30 is formed between lower and upper lead structures 15 & 40. The leads 15 & 40 typically are used both to provide, and to detect changes in, sensing current through the sensor element 30. Insulative material 35, such as alumina, $SiO_2$, or other known insulative material, may be formed adjacent the side walls 30a & 30b between the leads 15.

Figure 2:
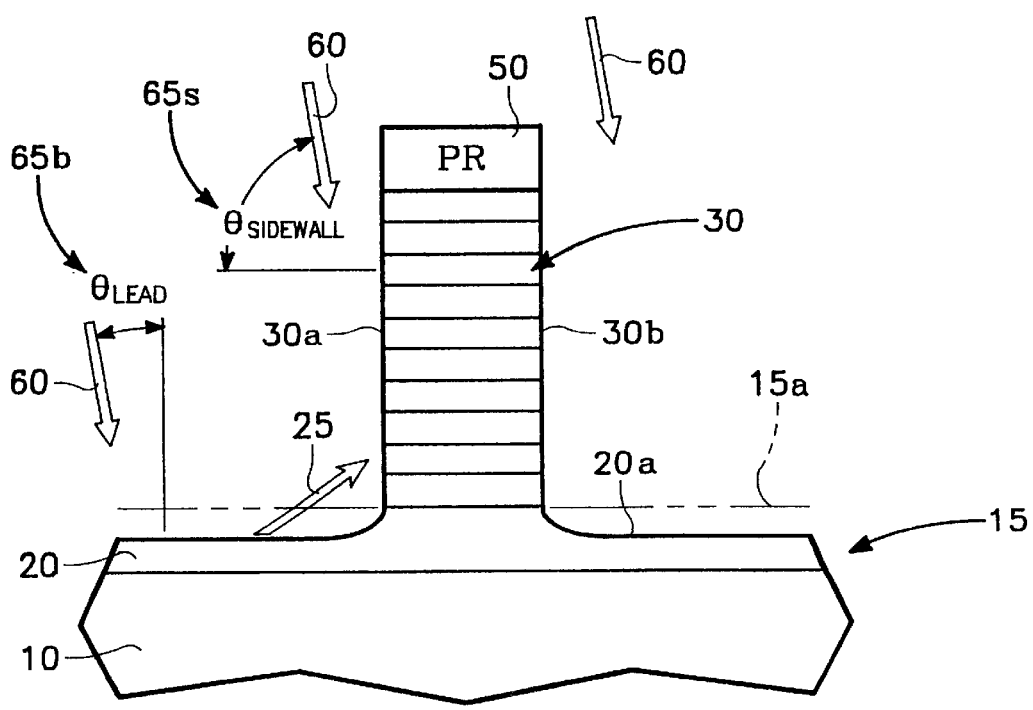
FIG. 2 shows view from the air bearing surface of a partially fabricated current perpendicular to the plane read head in accordance with the present invention.

Referring to FIGS. 1 & 2, typically a photoresist mask 50 is used to pattern the sensor element 30 for ion milling 60. Such a process may be used to defined a pedestal shaped sensor element 30 from deposited thin film layers of sensor material. The sensor element may be a giant magnetoresistive multilayer, a spin valve, a spin tunneling junction, or the like, or other known stacked multilayer sensor element.

Because the lower lead 15 is used a base to form the sensor element on, an upper portion 15a of the lower lead 15 is removed by the ion milling 60 during sensor formation. This removed material may redeposit on the side walls 30a & 30b of the sensor element 30 as depicted by arrow 25. In convention CPP devices, this redeposited lead material can cause detrimental current shunting. With the present invention, however, the lower lead 15 is formed so as to inhibit accumulation of removed lower lead material 15a on side walls 30a & 30b of the sensor element 30.

In the preferred embodiment of the present invention, the material used to form the upper portion 15a of the lead, which is exposed to ion milling, is selected based upon its sputter yield and its ion beam-to-milling surface angle characteristics. By selecting a material having a low sputter yield, redeposition flux to the side walls is reduced. Furthermore, by selecting a material having a low value for the ratio between the low angle yield and the high angle yield, redeposition accumulation may be minimized. In other words, a good material to inhibit side wall redeposition accumulation has an increased sputter yield as the milling angle, with respect to the surface milled, increases over the desired range of milling angles.

Figure 3:
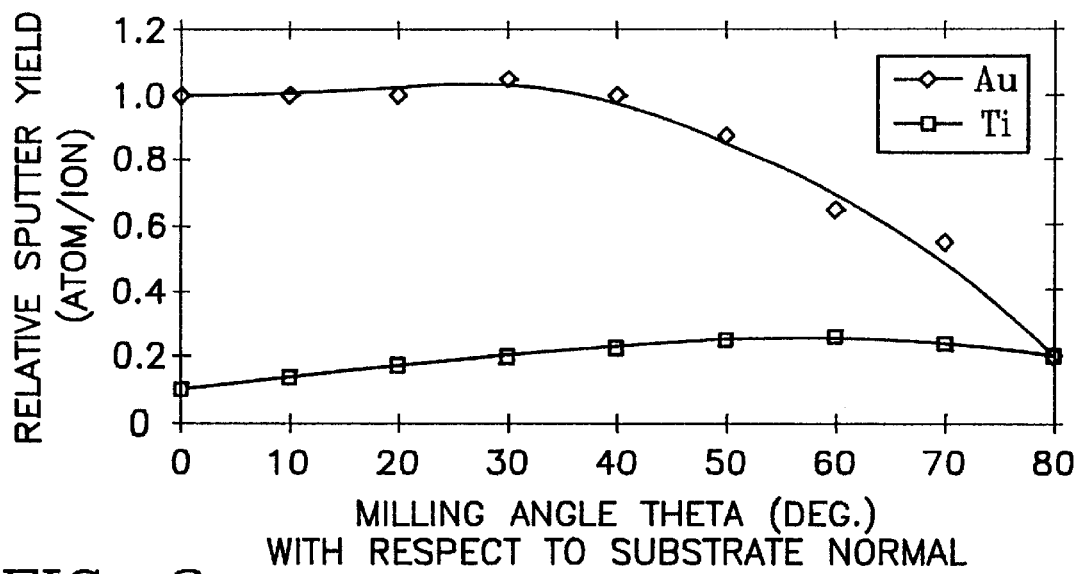
FIG. 3 is a graph of relative sputter yield verses ion milling angle theta with respect to substrate normal for gold and titanium.

FIG. 3 shows empirical data of relative sputter yield verses ion beam-to-substrate angle for gold and titanium. As illustrated by FIG. 3, the relative sputter yield of gold is higher than that of titanium over the range of zero degrees to near 80 degrees. As a result, less titanium would sputter from the lead surface and redeposit on the sidewalls of the sensor when defining the sensor element. As such, due to its lower sputter yield over a typical range of employed milling angles, titanium is a better element for reducing redeposition accumulation because it produces a smaller redeposition flux. It is expected that selecting a material with at least 10 percent lower sputter yield than conventional lead material, at the desired milling angle, would provide a useful reduction in redeposition accumulation on the sensor element sidewalls.

Moreover, as illustrated by FIG. 3, the sputter yield for decreases from a relative value of one for a zero degree milling angle to less than about 0.2 for an 80 degree milling angle. The sputter yield for titanium, on the other hand, increases from a relative value of about 0.1 for a zero degree milling angle to about 0.2 for an 80 degree milling angle. As such, titanium is a better material to use as lead material 15a adjacent the sensor element 30 for the purpose of reducing redeposition accumulation on the side walls 30a & 30b of the sensor element 30. Titanium and gold were used for comparison purposes as a non-exclusive example, other materials may be used to provide desirable results as discussed further below.

Referring to FIG. 2, using the low sputter yield ratio material for etched portion 15a of the lower lead 15, allows the milling angle $\theta_{lead}$ of the lower lead 15 with respect to normal, shown by reference number 65b, to be selected small to improve etch rate of the lead material, to reduce shadowing, and to reduce reflections. Because the surface 20a of the lead 15 and the side walls 30a & 30b are generally orthogonal, selection of a small milling angle $\theta_{lead}$ will produce a corresponding large milling angle $\theta_{sidewall}$ with the sensor element side wall 30a, with respect to sidewall normal, shown by reference number 65s. Using a low sputter yield ratio material allows the larger milling angle $\theta_{sidewall}$ to remove lead material redeposition so as to inhibit accumulation of lead material on the side wall 30a. Thus, it is preferred to form the etched portion 15a of the lower lead of a material that has a low value for the ratio of its sputter yield at the lead milling angle $\theta_{lead}$-to-its sputter yield at the side wall milling angle $\theta_{sidewall}$.

Referring to FIGS. 1 & 2, some embodiments of the present invention may provide a low sputter yield upper portion by forming the entire lead of low sputter yield material, which can minimize fabrication steps. Other embodiments may have the lower lead 15 formed by cladding over convention lead material with a low sputter yield ratio material. In some embodiments, the cladding 20 may be formed of multiple layers of material, each of which may be formed of a different low sputter yield material.

Cladding conventional lead material is preferred in some embodiments because although low sputter yield ratio materials improve accumulation redeposition, they typically do not have as low resistivity as conventional lead materials. Low resistance leads are necessary to improve the overall magnetoresistive effect $\Delta R/R$ of the device, particularly in CPP devices. Thus, cladding rather than forming the entire structure from low sputter yield material also allows lead resistance to be minimized. In the preferred embodiment, the cladding 20 is formed of sufficient thickness to prevent etching of the underlying lead material 10 during the etch process to define the sensor element 30.

Furthermore, in some embodiments, it is preferable to select a low sputter yield material which also has a low resistance for cladding 20 to further minimize lead 15 resistance. Although it is only necessary that the etched portion 15a of the cladding 20 be formed of low sputter yield ratio material to reduce redeposition accumulation, the cladding 20 may also extend between the sensor element 30 and the underlying low resistivity material 10 in some embodiments. In such embodiments, it is preferable to select a low resistance material for cladding 20 to minimize sensor lead 15 resistance.

As such, for example, refractory metals are expected to exhibit improved sidewall redeposition accumulation as compared to typical conductive lead materials, such as copper, silver, gold, aluminum, or the like, while also providing adequate electrical conduction. For example, tantalum, titanium, tungsten, molybdenum, zirconium, vanadium, niobium, their alloys, or the like, are expected have desirable low sputter yield ratios and sufficiently low resistivity so as to not significantly reduce the magnetoresistive effect of the device. Hence, the presently preferred embodiments of the invention provide a low resistance lower lead structure to optimize $\Delta R/R$ while inhibiting redeposition accumulation on the side walls 30a & 30b of the sensor element 30.

In addition, as the upper portion of the lead of the preferred embodiments has a higher resistivity than typical lead materials, any sidewall redeposition that may occur will have higher resistivity than conventional sidewall deposition. Thus, even if some amount of redeposition does occur, preferred embodiments provide reduced shunt current in sidewall redeposition as compared to typical lead material sidewall deposition.

Furthermore, because the preferred embodiments of the present invention allow the milling angle with respect to the workpiece to be minimized, processing characteristics are improved. With larger structures, the milling angle with respect to the plane of the workpiece may be varied to remove greater amounts of sidewall redeposition. As the geometry of the element is reduced, however, such a solution becomes impractical. Not only does it impede manufacture rate by reduce vertical milling rate and require more stringent process control, but it also increases shadowing and reflection of the milling beam. Shadowing and reflection limit precise formation of head elements, particularly at small geometries. So, at smaller geometries, increasing the milling angle to reduce sidewall redeposition accumulation is not practical.

The preferred embodiments of the present invention allow a low milling angle to reduce shadowing and reflection. Thus, the preferred embodiments allow for precise formation of a small sensor element, which is necessary to improve track width and aerial density. The structure and method of the preferred embodiment are expected to produce areal density up to in the range of about 10 Gigabits per inch to 40 Gigabits per inch in typical giant magnetoresistive CPP devices.

Figure 4:
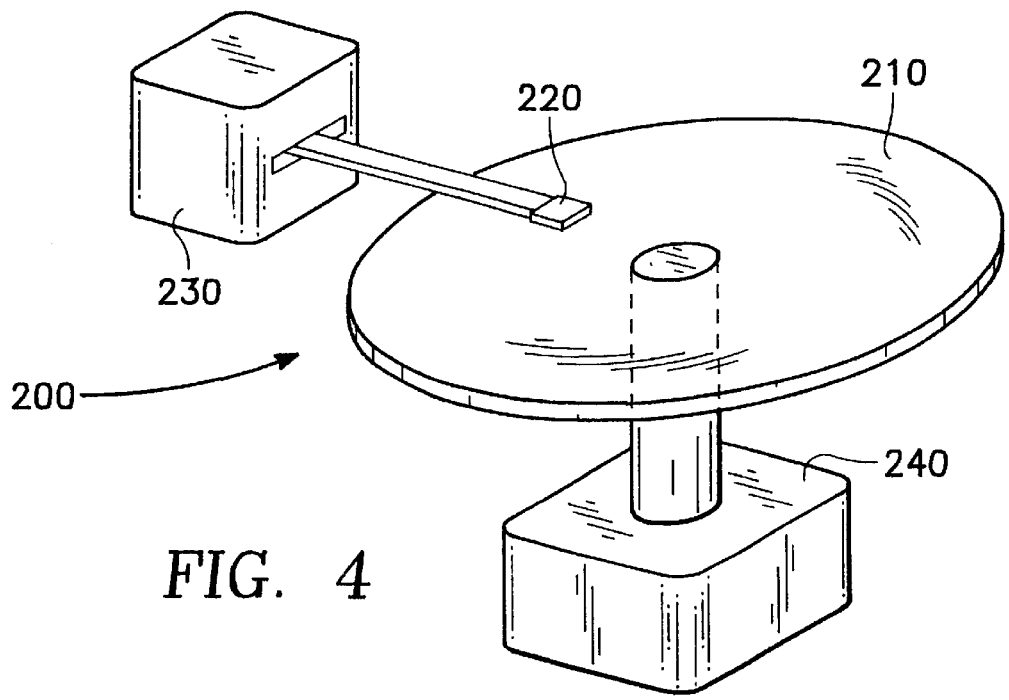
FIG. 4 depicts an embodiment of the current perpendicular to the plane read head embodied in a data storage and retrieval apparatus in accordance with the present invention.

FIG. 4 shows the thin film write head of the present invention embodied in a disk type magnetic data storage and retrieval apparatus 200. The read head of the present invention is located within a merged head assembly 220 which rides above a magnetic storage media 210, depicted in FIG. 4 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Embodiments of the present invention may utilize the teaching of U.S. patent application Ser. No. 09/266,678, by Ronald A. Barr, entitled CURRENT PERPENDICULAR TO THE PLANE MAGNETORESISTIVE DEVICE WITH LOW RESISTANCE LEAD, filed on Mar. 11, 1999, issued as U.S. Pat. No. 6,134,089, on Oct. 17, 2000, herein incorporated by reference in its entirety, to improve lead resistance if desired.

Figure 5:
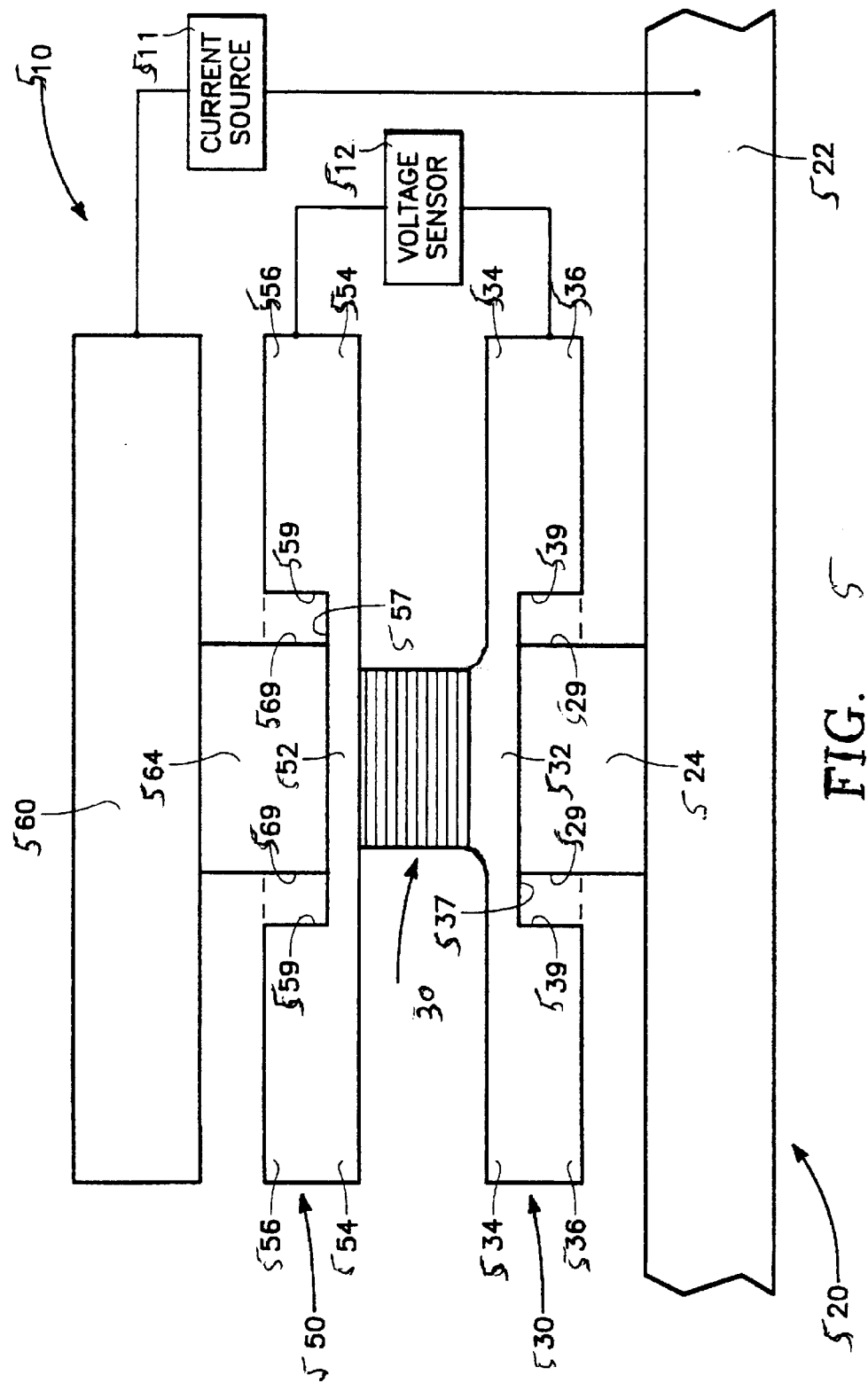
FIG. 5 is a cross sectional view of an embodiment of the thin film read head in accordance with the present invention.

Specifically, turning to FIG. 5, the present invention utilizes an improved thin film head 510. The structure of the thin film head 510 of the present invention may comprise: a lower shield 520, a lower sensor lead 530, a sensor element 30 (e.g., a magnetoresistive structure), an upper sensor lead 550, and an upper shield 560. The upper and lower shields 560 and 520 are used to prevent stray magnetic flux from being detected by the sensor element 30. The upper and lower shields 560 and 520 (which may be referred to as shield pedestals) may include pedestal portions 564 and 524, respectively. The upper and lower shields 560 and 520 may be formed of NiFe or another magnetic material, as is known in the art.

The upper and lower shields 560 and 520 prevent magnetic flux from adjacent bits on the media from being detected by the sensor element 30. This allows closer placement of the bits on the media, which improves data density. Furthermore, the distance between the shields determines, in part, the data density on the media. Closer placement of the shields 560 and 520 with respect to the sensor element 30 allows closer placement of neighboring bits on the media so as to improve the linear density of the bits. The shield layers may comprise nickel iron (NiFe), cobalt zirconium tantalum (CoZrTa), iron nitride (FeN) and other soft magnetic materials and their alloys. The shield layers may be on the order of 2 microns or less in thickness.

In the embodiment of FIG. 5, a current source 511 is coupled to the shields to provide current across the sensor element 30 perpendicular to the plane of the layers. A voltage sensor 512 is coupled to the upper and lower sensor leads 550 and 530 to detect voltage changes across the sensor element 30 as its resistance changes in response to a changing magnetic flux from the media.

As such, the resistance of the sensor leads 550 and 530 are also measured by the voltage sensor 512. Therefore, the resistance of the sensor leads 550 and 530 must be minimized to optimize the measurement of the magnetoresistive effect $\Delta R/R$. This is particularly important in current perpendicular to the plane giant magnetoresistive (CPP GMR) devices. As such, the upper and lower sensor leads 550 and 530 may be formed of gold, silver, copper, aluminum, or other low resistance materials.

The upper and lower sensor leads 550 and 530 are located between the sensor element 30 and the respective upper or lower pedestals 564 and 524. The upper and lower sensor leads 550 and 530 have thin portions 552 and 532 between the sensor element 30 and the respective upper or lower pedestals 564 and 524. The upper and lower sensor leads 550 and 530 additionally have portions 554 and 534, respectively, extending laterally to either side of thin portions 552 and 532, as shown in FIG. 5. To reduce the resistance of the upper and lower sensor leads 550 and 530, the upper and lower sensor leads 550 and 530 can also include projecting portions 556 and 536 projecting upward and downward, respectively, from portions 554 and 534. The upper and lower projecting portions 556 and 536 may abut the pedestals 564 and 524, as shown in phantom in FIG. 5, or may be separated from pedestals 564 and 524 as shown with the solid lines.

In those embodiments that include upper and lower projecting portions 556 and 536, a recess 557 positioned above the thin portion 552 is defined in the upper sensor lead 550 and a recess 537 positioned below the thin portion 532 is defined in the lower sensor lead 530. The pedestals 564 and 524 of the upper and lower shields 560 and 520 are located within the recesses 557 and 537. In those embodiments in which the projecting portions 556 and 536 abut the pedestals 564 and 524, walls 559 and 539 of the upper and lower projecting portions 556 and 536 may be in contact with the walls 569 and 529 of the pedestals 564 and 524, respectively.

The upper projecting portions 556 of the upper sensor lead 550 may be formed by depositing lead material onto the lateral portion 554 of the upper sensor lead 550. The upward projecting portions 556 may be deposited on the lateral portions 554 of the upper sensor lead 550 after the upper sensor lead 550 has been planarized in preparation for forming the upper pedestal 564. The upward projecting portions 556 may also be deposited after the upper pedestal 564 is formed.

The lower projecting portions 536 of the lower sensor lead 530 may be formed by inserting lead material into the dielectric region normally located below the lateral portion 534 of the lower sensor lead 530. The downward projecting portions 536 may be deposited after the lower pedestal 524 is formed. In some embodiments the downward projecting portions 536 of the lower sensor lead 530 are formed by masking and etching the dielectric, such as alumina, to form a cavity and then depositing within the cavity a conductive sensor lead material. After deposition, the top surface of downward projecting portions 536 may be planarized along with the top surface of the lower pedestal 524 in preparation for deposition of a lower sensor lead layer used to form the between and lateral portions 532 and 534.

The sensor element 30 has a layered structure and may be a multilayer giant magnetoresistive device, a spin dependent tunneling device, a spin valve type device as disclosed in U.S. Pat. No. 5,668,688, by Dykes et al., entitled "CURRENT PERPENDICULAR-TO-THE-PLANE SPIN VALVE TYPE MAGNETORESISTIVE TRANSDUCER," issued on Sep. 16, 1997, herein incorporated by reference in its entirety, or any other structure known in the art. The sensor element 30 is located between the thin portions 552 and 532 of the upper and lower sensor leads 550, 530 so that current is supplied perpendicular to the plane of the layers of the structure.

Figure 6:
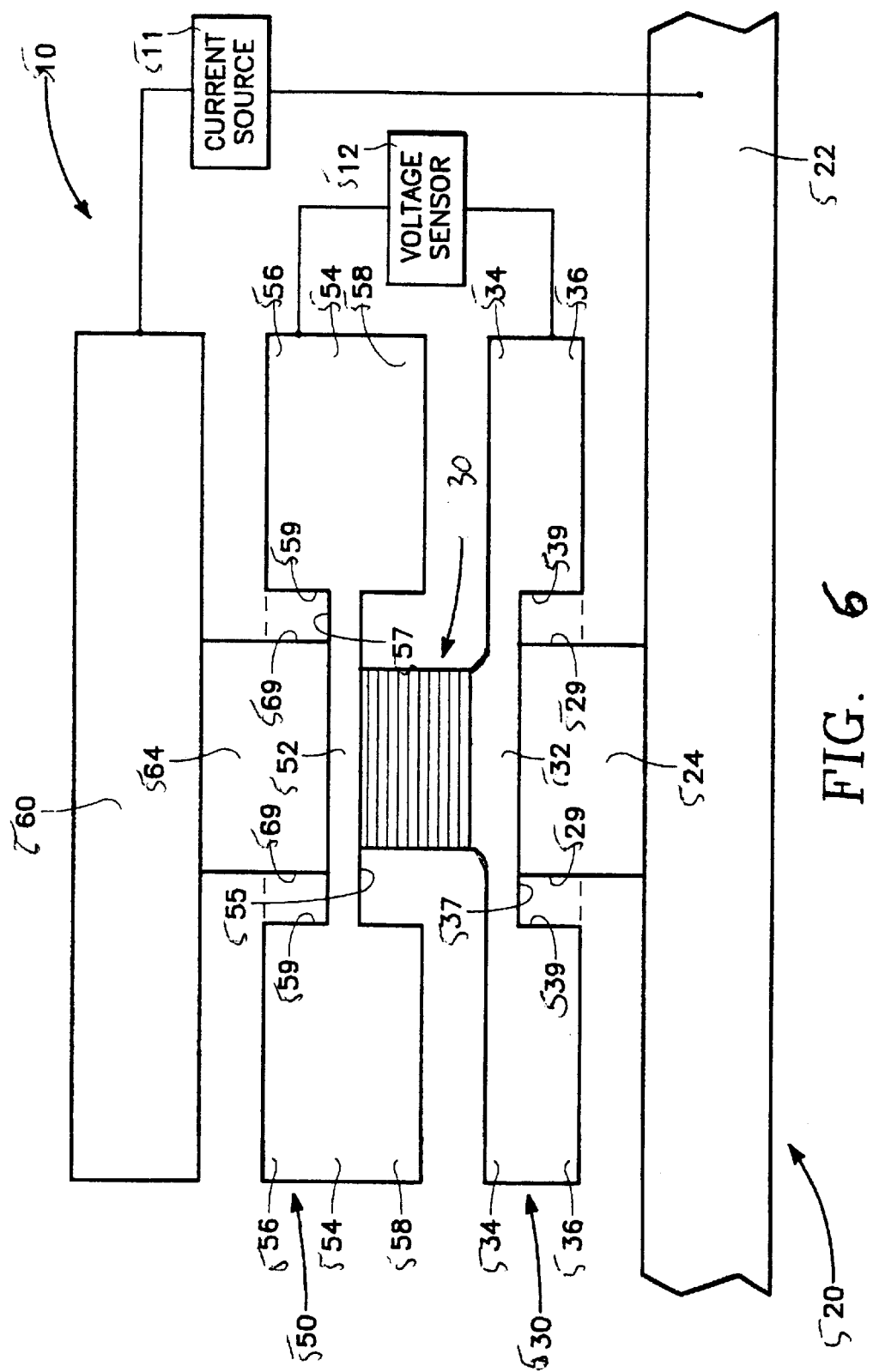
FIG. 6 is a cross sectional view of an embodiment of the thin film read head in accordance with the present invention.

Turning to FIG. 6, in addition to the features in the embodiments discussed with reference to FIG. 5, the embodiment of FIG. 6 further includes a portion projecting downward from each of the lateral portions 554 of the upper sensor lead 550. The downward projecting portions 558 define therebetween a recessed portion 555 in the upper sensor 550. The sensor element 30 is located within the recessed portion 555. The downward projecting portions 558 of the upper sensor lead 550 further reduce the resistance of the upper sensor lead 550 without increasing the spacing between the pedestals 564 and 524.

The downward projecting portions 558 of the upper sensor lead 550 may be formed by masking and etching the dielectric normally located under the upper sensor lead 550 to form a cavity, and then filling the cavity with a conductive sensor lead material. It should be noted that the downward projecting portions 558 should not abut the sensor element 30 to prevent shunting. Furthermore, there must be sufficient dielectric material between the downward projecting portions 558 and the lateral portions 534 of the lower sensor lead 530 to insure adequate insulation therebetween.

The present invention provides the low resistance sensor leads 550 and 530 without increasing the distance between the pedestals 564 and 524 of the upper and lower shields 560 and 520, thus allowing for high data density while improving the magnetoresistive effect.

Figure 7:
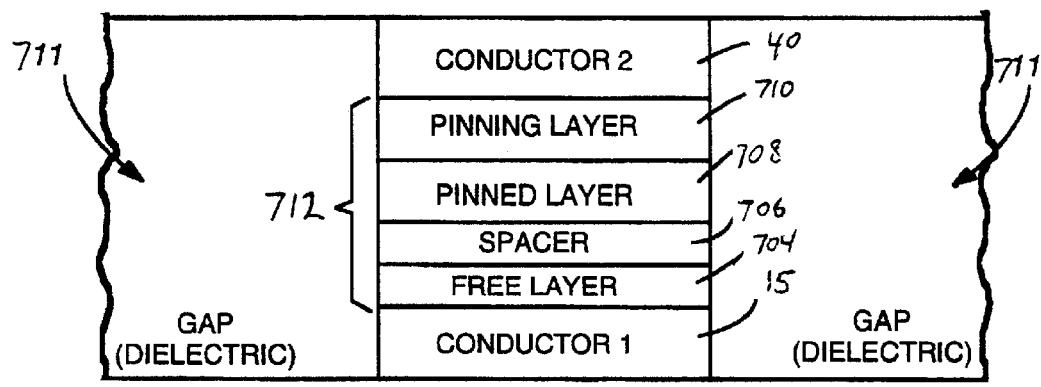
FIG. 7 is a partial ABS view of a current perpendicular-to-the-plane spin valve type magnetoresistive transducer in accordance with a particular embodiment of the present invention.

With reference now to FIG. 7, returning to the spin valve structure of U.S. Pat. No. 5,668,688, cited above, a partial ABS view of a current perpendicular-to-the-plane spin valve type sensor element 30 in accordance with a particular embodiment of the present invention is shown.

A spin valve structure 712 includes a free layer 704 above a first current conductor, lead structure 15, a non-magnetic spacer layer 706 above the free layer 704, and a pinned layer 708 above the spacer layer 706. A pinning layer 710 overlies the pinned layer 708. A second current conductor, lead structure 40, formed of a material similar to that utilized to produce lead structure 15, is formed over the pinning layer 710. An upper shield (not shown) overlies the lead structure 40. A dielectric gap material 711 surrounds the spin valve structure 712, as shown. It will be appreciated that although the spin valve structure 712 in the above example of a sensor element 30 is shown as a single spin valve structure, other spin valve structures known in the art can also be used for sensor element 30.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A current perpendicular to the plane thin film read head, comprising:
    a sensor element including a top surface and a bottom surface;
    an upper lead electrically coupled to the top surface; and
    a lower lead including
        an upper portion formed essentially of titanium and electrically coupled to the bottom surface, and
        a lower portion formed essentially of gold, silver, aluminum, or copper.

2. A current perpendicular to the plane thin film read head, comprising:
    a sensor element including a top surface and a bottom surface;
    an upper lead electrically coupled to the top surface; and
    a lower lead including
        an upper portion formed essentially of tungsten and electrically coupled to the bottom surface, and
        a lower portion formed essentially of gold, silver, aluminum, or copper.

3. A current perpendicular to the plane thin film read head, comprising:
    a sensor element including a top surface and a bottom surface;
    an upper lead electrically coupled to the top surface; and
    a lower lead including
        an upper portion formed essentially of zirconium and electrically coupled to the bottom surface, and
        a lower portion formed essentially of gold, silver, aluminum, or copper.

4. A current perpendicular to the plane thin film read head, comprising:
    a sensor element including a top surface and a bottom surface;
    an upper lead electrically coupled to the top surface; and
    a lower lead including
        an upper portion formed essentially of vanadium and electrically coupled to the bottom surface, and
        a lower portion formed essentially of gold, silver, aluminum, or copper.

5. A current perpendicular to the plane thin film read head, comprising:
    a sensor element including a top surface and a bottom surface;
    an upper lead electrically coupled to the top surface; and
    a lower lead including
        an upper portion formed essentially of niobium and electrically coupled to the bottom surface, and
        a lower portion formed essentially of gold, silver, aluminum, or copper.

6. A current perpendicular to the plane thin film read head, comprising:
    a sensor element including a top surface and a bottom surface;
    an upper lead electrically coupled to the top surface; and
    a lower lead including
        an upper portion formed essentially of molybdenum and electrically coupled to the bottom surface, and
        a lower portion formed essentially of gold, silver, aluminum, or copper.

7. A current perpendicular to the plane thin film read head, comprising:
    a sensor element including a top surface and a bottom surface;
    an upper lead electrically coupled to the top surface; and
    a lower lead including
        an upper portion formed essentially of titanium, tungsten, molybdenum, zirconium, vanadium, or niobium, and electrically coupled to the bottom surface, and
        a lower portion formed essentially of a material that is different from the upper portion and is a non-magnetic conductive material.

8. A data storage and retrieval system comprising:
    a current perpendicular to the plane thin film read head, including
        a sensor element having a top surface and a bottom surface,
        an upper lead electrically coupled to the top surface, and
        a lower lead having at least
            an upper portion electrically coupled to the bottom surface and formed of at least one layer of a low sputter yield material, and
            a lower portion in direct contact with the upper portion and formed of a nonmagnetic material with a higher conductivity and a higher sputter yield than the upper portion.

9. The system of claim 8 wherein the upper portion includes multiple layers, each of the layers being of a different low sputter yield material.

10. The system of claim 8 wherein the upper portion is not tantalum.

11. The system of claim 8 wherein the upper portion has a pedestal portion having
    a pedestal base,
    a pedestal top that contacts the bottom surface, and
    tapered sidewalls that are substantially vertical at the pedestal top and substantially horizontal at the pedestal base; and
    a lower top surface at the level of the pedestal base.

12. The system of claim 8 wherein the read head further includes a lower shield such that the lower lead is disposed between the sensor element and the lower shield.

13. The system of claim 12 wherein the lower shield has a lower shield pedestal projecting towards the lower lead.

14. The system of claim 13 wherein the lower lead has lower lead projecting portions projecting downward and defining a first space therebetween, and wherein the lower shield pedestal is at least partially disposed within the first space.

15. The system of claim 14 wherein the lower lead projecting portions abut the lower shield pedestal.

16. The system of claim 12 wherein the sensor includes a pinning layer adjacent to a pinned layer such that the pinned layer is located between the pinning layer and a spacer layer.

17. The system of claim 8 wherein the lower lead has lower lead projecting portions projecting downward and defining a first space therebetween.

18. The system of claim 8 wherein the read head further includes an upper shield such that the upper lead is disposed between the sensor element and the upper shield.

19. The system of claim 18 wherein the upper shield has an upper shield pedestal projecting towards the upper lead.

20. The system of claim 19 wherein the upper lead has upper lead projecting portions projecting upward and defining a first space therebetween, and wherein the upper shield pedestal is at least partially disposed within the second space.

21. The system of claim 20 wherein the upper lead projecting portions abut the upper shield pedestal.

22. The system of claim 20 wherein the upper lead has upper lead downward projecting portions projecting downward and defining a second space therebetween, and wherein the sensor element is disposed at least partially within the third space.

23. The system of claim 8 wherein the upper lead has upper lead projecting portions projecting upward and defining a first space therebetween.

24. The system of claim 8 wherein the upper lead has upper lead downward projecting portions projecting downward and defining a second space therebetween, and wherein the sensor element is disposed at least partially within the third space.

25. The system of claim 8 wherein the sensor includes
a free layer;
a pinned layer; and
a conductive spacer layer disposed between the free layer and the pinned layer.

26. The system of claim 8 further comprising
a magnetic storage media;
an arm upon which the read head is mounted;
an actuating means to position the arm proximate to the magnetic storage media; and
a motor for rotating the magnetic storage media.

27. A data storage and retrieval system comprising:
a current perpendicular to the plane thin film read head including
a sensor element having between a top surface and a bottom surface
a free layer,
a pinned layer,
a conductive spacer layer disposed between the free layer and the spacer layer, and
an antiferromagnetic layer adjacent to the pinned layer;
an upper lead electrically coupled to the top surface;
a lower lead having at least
an upper portion electrically coupled to the bottom surface and formed of at least one layer of a low sputter yield material, and
a lower portion in direct contact with the upper portion and formed of a nonmagnetic material with a higher conductivity and a higher sputter yield than the upper portion;
an upper shield coupled to the upper lead by an upper shield pedestal;
a lower shield coupled to the lower lead by an upper shield pedestal;
a current source coupled between the upper and lower shields; and
a voltage sensor coupled between the upper and lower leads;
a magnetic storage media;
an arm coupled to the read head;
an actuating means to move the arm in order to position the read head proximate to the magnetic storage media; and
a motor for rotating the magnetic storage media.

* * * * *